United States Patent [19]

Hughes et al.

[11] Patent Number: 5,063,342

[45] Date of Patent: Nov. 5, 1991

[54] TEMPERATURE THRESHOLD SENSING CIRCUIT

[75] Inventors: John B. Hughes, Hove; Kenneth W. Moulding, Horley, both of England

[73] Assignee: U.S. Philips Corporation, New York, N.Y.

[21] Appl. No.: 401,729

[22] Filed: Aug. 31, 1989

[30] Foreign Application Priority Data

Sep. 19, 1988 [GB] United Kingdom ............... 8821910

[51] Int. Cl.$^5$ ..................... G05F 3/22; G05F 1/569
[52] U.S. Cl. ................................ 323/315; 323/316; 323/317; 323/907
[58] Field of Search ............... 361/92, 103; 323/215, 323/216, 907; 207/210

[56] References Cited

U.S. PATENT DOCUMENTS

| | | | |
|---|---|---|---|
| 4,287,439 | 9/1981 | Leuschner | 307/310 |
| 4,751,404 | 6/1982 | Yuen | 307/310 X |
| 4,935,690 | 6/1990 | Yan | 323/907 X |

*Primary Examiner*—Steven L. Stephan
*Assistant Examiner*—Adolf Berhane

*Attorney, Agent, or Firm*—Bernard Franzblau

[57] ABSTRACT

An integrated temperature threshold sensing circuit comprises first and second bipolar transistors (Q1, Q2) biased so that the current density in the first transistor is larger than that in the second transistor by a first known factor. The first and second transistors have their collectors and bases connected to a first bias voltage source and to a second bias voltage source, respectively, and their emitters connected respectively to first and second current sources (12,14) for passing first and second bias currents ($I_1$, $I_2$) of known relative proportions (K:1) through the respective first and second transistors. A voltage comparator (26) is arranged to compare a first predetermined fraction (R(R+r)) of the base-emitter voltage of the first transistor (Q1) with a second, larger predetermined fraction (1) of the base-emitter voltage of the second transistor (Q2) so that an output (28) of the comparator assumes a first state when the temperature of the two devices is above a known threshold temperature and assumes a second state when the temperature of the two devices is below the known threshold temperature. The circuit is accurate and is compatible with MOS technology.

20 Claims, 2 Drawing Sheets

TEMPERATURE THRESHOLD SENSING CIRCUIT

BACKGROUND OF THE INVENTION

This invention relates to a temperature threshold sensing circuit comprising first and second bipolar transistors formed together as part of an integrated circuit and being biased so that the current density flowing in the first transistor is larger than that in the second transistor by a first known factor. The invention can be used in a circuit as set forth in the previous sentence which is suitable for integration alongside a power semiconductor device in order to guard against overheating of the power device. Such a combination may form a part of a so-called "smart power" integrated circuit (chip).

A temperature threshold sensing circuit as set forth in the opening paragraph is known from U.S. Pat. No. 4,733,162. The known circuit achieves a high accuracy by relying on the well-defined dependence of the voltage $V_{BE}$ across a semiconductor junction on the forward current density and the absolute temperature of the junction. The circuit detects the passing of a threshold temperature defined by the ratio of two integrated resistors.

A problem arises with the known circuit, and others known, for example, from U.S. Pat. No. 4,021,722 and U.S. Pat. No. 3,809,929, in that they are not suitable for integration in certain types of power chip, because of limitations of the process steps used in their manufacture. For example, processes used to manufacture the low voltage CMOS circuitry in "high-side" power switching chips, such as that described in European Patent Application EP-A2-0 294 882, may only provide npn bipolar transistors (unless extra process steps are added). Furthermore, these npn transistors may only be vertical devices used in a common-collector configuration because the n-type substrate which forms the drain of an n-channel power MOSFET (or it could be the collector of a vertical npn power bipolar transistor) is permanently connected to the positive supply rail.

Another problem is the large number of matched bipolar transistors that are involved in the temperature sensing in the known circuit, which all have to be at the same temperature. In smart power applications, where the source of heat is on the chip itself, very large temperature gradients can exist across the chip and positioning all of the temperature sensing transistors close enough to the source of heat for a rapid and accurate response to transients becomes difficult.

SUMMARY OF THE INVENTION

It is an object of the invention to enable the provision of an accurate temperature threshold detecting circuit which is more suitable for integration in a smart power integrated circuit than the circuits of the prior art.

The invention provides a temperature threshold sensing circuit as set forth in the opening paragraph, characterised in that the said first and second transistors have their collectors connected to a first bias voltage source, their bases connected to a second bias voltage source and their emitters connected respectively to first and second current sources for passing first and second bias currents of known relative proportions through the respective first and second transistors, and in that the circuit further comprises a voltage comparator arranged to compare a first predetermined fraction of the base-emitter voltage of the first transistor with a second, larger predetermined fraction of the base-emitter voltage of the second transistor so that an output of the comparator adopts a first state when the temperature of the two devices is above a known threshold temperature and adopts a second state when the temperature of the two devices is below the known threshold temperature. Such a circuit operates by detecting the crossover of two non-linear temperature-dependent voltages, which occurs at a well-defined threshold temperature. The circuit requires only two transistors to be located near the source of heat, and these transistors may be common-collector types for compatibility with a wide range of smart power processes. The remainder of the circuit can be made using, for example, CMOS or some other circuit technology to which the process is best suited.

It is noted that U.S. Pat. No. 4,287,439 discloses an MOS bandgap reference circuit which uses common-collector bipolar transistors, but the circuit has in other respects a different configuration to that of the invention. The circuit of U.S. Pat. No. 4,287,439, does not provide temperature threshold detection. Furthermore, although it is known in principle to extend such a circuit to provide temperature threshold detection, a circuit in accordance with the invention has a better immunity against offset errors than a bandgap circuit extended according to known principles.

The second transistor may have an effective emitter area larger than that of the first transistor by a second known factor. The first bias current may be larger than the second bias current by a third known factor. Either of these features, or both in combination can be used to accurately define the first known factor (that is the ratio of the two current densities) as a product of the second and third known factors. Using a combination of both, a high ratio of current densities can be achieved in a relatively compact circuit.

The first and second bias voltage sources may be the same, so that the first and second transistors behave as simple diodes, or the bases may be maintained at a voltage offset from that of a main voltage supply to which the collectors are connected. This latter feature may be advantageous since otherwise the input voltages to the comparator may be too close to the supply voltage to allow proper operation.

The circuit may comprise a potential divider connected between the base and emitter of the first transistor for obtaining the said first predetermined fraction of the base-emitter voltage of that transistor. The potential divider will inevitably divert some of the first bias current away from the first transistor. If the resistance of the potential divider is very large the diverted current may be insignificant. Otherwise, measures can be taken to compensate.

In one embodiment, the circuit further comprises a resistor connected between the base and emitter of the second transistor, the ratio of the total resistance of the potential divider to that of the resistor being equal to the ratio of the base-emitter voltages of the first and second transistors respectively at the threshold temperature divided by the ratio of the first and second bias currents respectively.

The resistor may comprise a further potential divider, for obtaining the second predetermined fraction of the voltage drop across the second transistor. In general, however, greatest sensitivity will be obtained when the second predetermined fraction is unity, that is to say when the first predetermined fraction of the base-emitter voltage of the first transistor is compared with the full base-emitter voltage of the second transistor.

The defined relationship between the values of the potential divider and the resistor (or further potential divider) ensures that at the threshold temperature the required proportionality between the current density in the two transistors is preserved while the potential divider(s) allows the first and second predetermined fractions of the respective base-emitter voltages to be compared.

In an alternative embodiment the first and second currents may be generated by first and second bias current sources dimensioned in accordance with the known relative proportions but modified to allow for current flowing through the potential divider. Although the effects of variations in resistor values will not be so well compensated as in the previous embodiment, the alternative embodiment provides improved sensitivity. Dependent on the particular manufacturing process used, this may lead to a better overall performance of the temperature sensing circuit.

The invention further provides an integrated circuit including a temperature threshold sensing circuit in accordance with the invention as set forth above, wherein the first and second bipolar transistors are integrated within or in close proximity to a power semiconductor device whose operating temperature is to be sensed.

In one embodiment, suitable for use for example, as a "high-side" power switch in automotive applications, the power device is an n-channel vertical power MOSFET and the first and second bipolar transistors are vertical npn transistors having collector regions continuous with a drain region of the power MOSFET.

BRIEF DESCRIPTION OF THE DRAWINGS

Embodiments of the invention will now be described, by way of example, with reference to the accompanying drawings in which.

DESCRIPTION OF THE PREFERRED EMBODIMENTS

Figure 1:
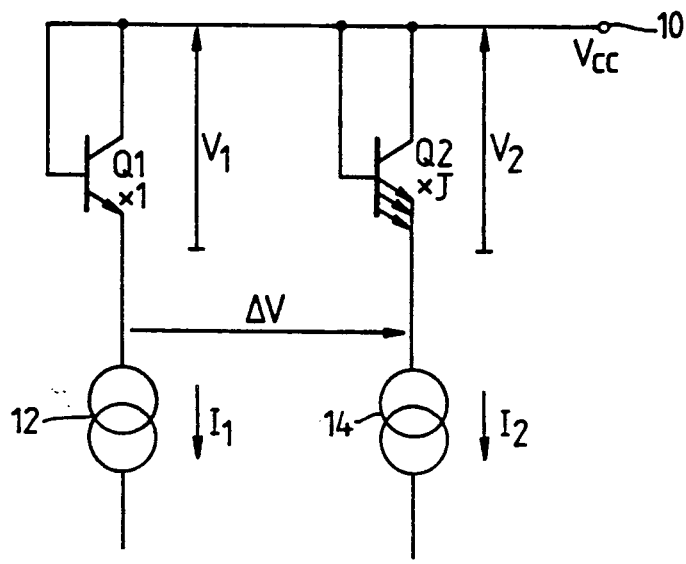
FIG. 1 is a circuit diagram illustrating the theoretical basis of the invention.

FIG. 1 shows first and second semiconductor junction devices Q1 and Q2 respectively which, in accordance with the invention, are formed by two bipolar transistors. The transistors Q1 and Q2 are integrated close to one another on the same substrate but can have different dimensions so that the effective emitter area of transistor Q2 is a factor J larger than that of transistor Q1.

The collectors and bases of the transistors Q1 and Q2 are connected to a supply 10 of voltage ($V_{CC}$). It will be seen later that the bases of the transistors Q1 and Q2 can alternatively be connected to a source of voltage $V_{BB}$ different from the collector voltage $V_{CC}$, but the principle of operation is the same in both cases.

The emitters of the transistors Q1 and Q2 are connected to first and second current sources 12 and 14, respectively. The current sources 12 and 14 draw first and second reference currents $I_1$ and $I_2$ through the junction devices Q1 and Q2, respectively. The currents $I_1$ and $I_2$ are held equal or are related by a known scaling factor K, so that $I_1 = K.I_2$. The scaling factors J and K cause the current density in the first junction device Q1 to be a factor JK greater than that in the second junction device Q2. If the currents $I_1$ and $I_2$ are equal, then the factor JK becomes simply J.

It is known that the voltage difference $\Delta V$ between the voltage drops $V_1$ and $V_2$ across the junction devices Q1 and Q2 respectively, is as defined by Equation (1) below, in which k is Boltzmann's constant ($1.38 \times 10^{-23}$ joule.kelvin$^{-1}$), T is the absolute temperature in kelvin of the devices Q1 and Q2, q is the electronic charge ($1.602 \times 10^{-19}$ coulomb) and ln(JK) is the natural logarithm of the ratio of the current density in device Q1 to that in device Q2. The main features to note are that $\Delta V$ is directly proportional to the absolute temperature T and is independent of the absolute values of the currents $I_1$ and $I_2$.

$$\Delta V = V_1 - V_2 = \frac{kT}{q} \ln(JK) \qquad (1)$$

Figure 2:
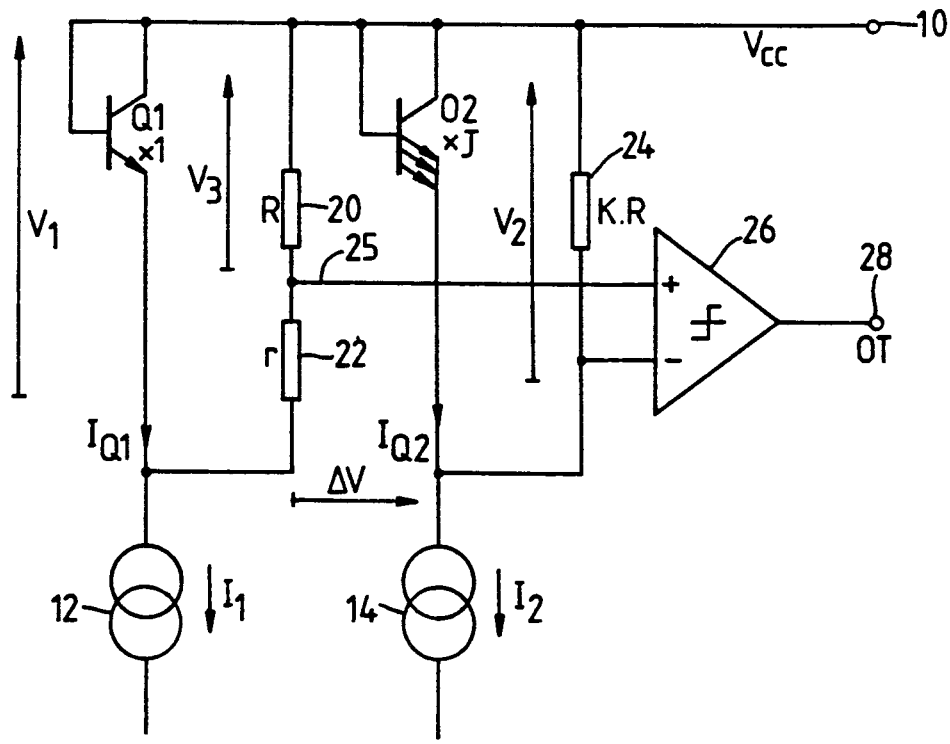
FIG. 2 is a schematic circuit diagram of a temperature threshold sensing circuit in accordance with the present invention.

FIG. 2 shows how the known relationship between $V_1$ and $V_2$ can be used to detect the passing of a predetermined threshold temperature in accordance with the present invention. The circuit comprises the semiconductor junction devices Q1 (x1) and Q2 (xJ) and the current sources 12 ($I_1$) and 14 ($I_2$) connected to the voltage supply 10 ($V_{CC}$) as in FIG. 1. However, in parallel with the first junction device Q1 there is a potential divider comprising a resistor 20 connected between the voltage supply 10 ($V_{CC}$) and a point 25, and a resistor 22 connected between the point 25 and the first current source 12. A further resistor 24 is connected in parallel with the second junction device Q2 between the supply 10 ($V_{CC}$) and the second current source 14.

The circuit further comprises a voltage comparator 26 which has a non-inverting input (+) connected to the point 25 and an inverting input (−) connected to the current source 14 (emitter of transistor Q2). The comparator has a logic output 28 which carries a logic signal OT='1' when the voltage $V_3$ between the point 25 and the voltage supply 10 ($V_{CC}$) is less than $V_2$ and carries a logic signal OT='0' when $V_3$ is greater than $V_2$.

The resistor 20 has a value $R_{20}$ equal to R, while the resistor 22 has a value $R_{22}$ equal to r. If the factor K=1, then the resistor 24 has the value $R_{24}$ also equal to R, but if K is not 1, then $R_{24} = K.R_{20} = K.R$. Since $V_1$ is greater than $V_2$ (the current density in device Q1 being greater than that in device Q2), the values R and r can be chosen so that the ratio $(R_{20} + R_{22})/R_{24} = (R+r)/(K.R)$ is equal to the ratio $V_1/V_2$ of the voltage drops across the two junction devices Q1 and Q2 at the desired threshold temperature $T_c$. This in turn means that $V_3$ equal $V_2$ at the desired threshold temperature $T_c$. With $V_3 = V_2$, the currents through the paths formed by the potential divider 20, 22 and the resistor 24 are related by the factor K as are the currents $I_1$ and $I_2$. The currents $I_{Q1}$ and $I_{Q2}$ in the junction devices Q1 and Q2 are then less than $I_1$ and $I_2$ by the amounts flowing through the resistors, but are still in the relation $I_{Q1} = K.I_{Q2}$. Therefore at the critical temperature $T_c$ the same conditions apply as in FIG. 1 and Equation (1) still holds.

It is therefore a reasonable approximation that for temperatures T close to $T_c$:

$$\Delta V = V_1 - V_2 = \frac{kT}{q} \ln(JK) \qquad (2)$$

and $$V_3 = \frac{R}{R+r} V_1 = \frac{R}{R+r} \left( V_2 + \frac{kT}{q} \ln(JK) \right) \qquad (3)$$

It is known that p-n junctions such as the base emitter junction of transistor Q2 have a negative temperature coefficient of voltage of approximately 2 millivolts per degree Celsius, so that $$V_2 = V_{BEc} - 0.002(T - T_c) \qquad (4)$$

where $V_{BEc}$ is the base-emitter forward voltage drop of the transistor Q2 at the threshold temperature $T_c$. From Equations (3) and (4) the voltage difference at the input of the comparator 26 is $$\begin{aligned} -(V_3 - V_2) &= -\frac{R}{R+r}\left(\frac{kT}{q}\ln(JK) + V_2\right) + V_2 \\ &= \left(1 - \frac{R}{R+r}\right)V_2 - \frac{R}{R+r}\frac{kT}{q}\ln(JK) \\ &= \frac{r}{R+r}(V_{BEc} - 0.002(T - T_c)) - \\ &\quad \frac{R}{R+r}\frac{kT}{q}\ln(JK) \end{aligned} \qquad (5)$$

Since we require $-(V_3 - V_2) = 0$ when $T = T_c$, $$0 = \frac{R}{R+r}\frac{kT_c}{q}\ln(JK) - \frac{r}{R+r}V_{BEc}$$

which means that the required ratio of resistances r and R is $$\frac{r}{R} = \frac{kT_c}{qV_{BEc}} \ln(JK) \qquad (6)$$

To determine the sensitivity of the circuit at the threshold temperature, one can simply differentiate Equation (5) to find that $$\frac{d(-(V_3 - V_2))}{dT} = \frac{R}{R+r}\frac{k}{q}\ln(JK) + 0.002\frac{r}{R+r} \qquad (7)$$

with the result in volts per degree Celsius.

Equation (6) shows that the absolute values R and r of the resistors do not affect the temperature $T_c$ at which the output of the comparator 26 switches from logic '0' to logic '1'. Since it is only the relative values of the resistors that are important, they can be made accurately enough as part of an integrated circuit since, as is known in the art, resistor values tend to track each other when integrated on the same substrate, particularly if they are formed close to each other. Similarly, the factors J and K can be defined accurately. The larger second junction device Q2 may for instance comprise J unit devices identical to the first device Q1. The currents $I_1$ and $I_2$ can be generated in the ratio K:1 by use of the well-known current mirror principle, as can be seen in the circuit of FIG. 3 which is described hereinafter.

The only value (apart from the physical constants k and q) which needs to be known in absolute terms is the base-emitter voltage $V_{BEc}$ of the transistor Q2 at the threshold temperature $T_c$. The value of $V_{BE}$ is generally well-defined in a given process and although it is temperature dependent, the temperature dependence is also well-defined. The invention has advantages over known circuits based on bandgap references, since in the present invention no attempt is made to compensate the temperature dependence of $V_{BE}$.

Figure 3:
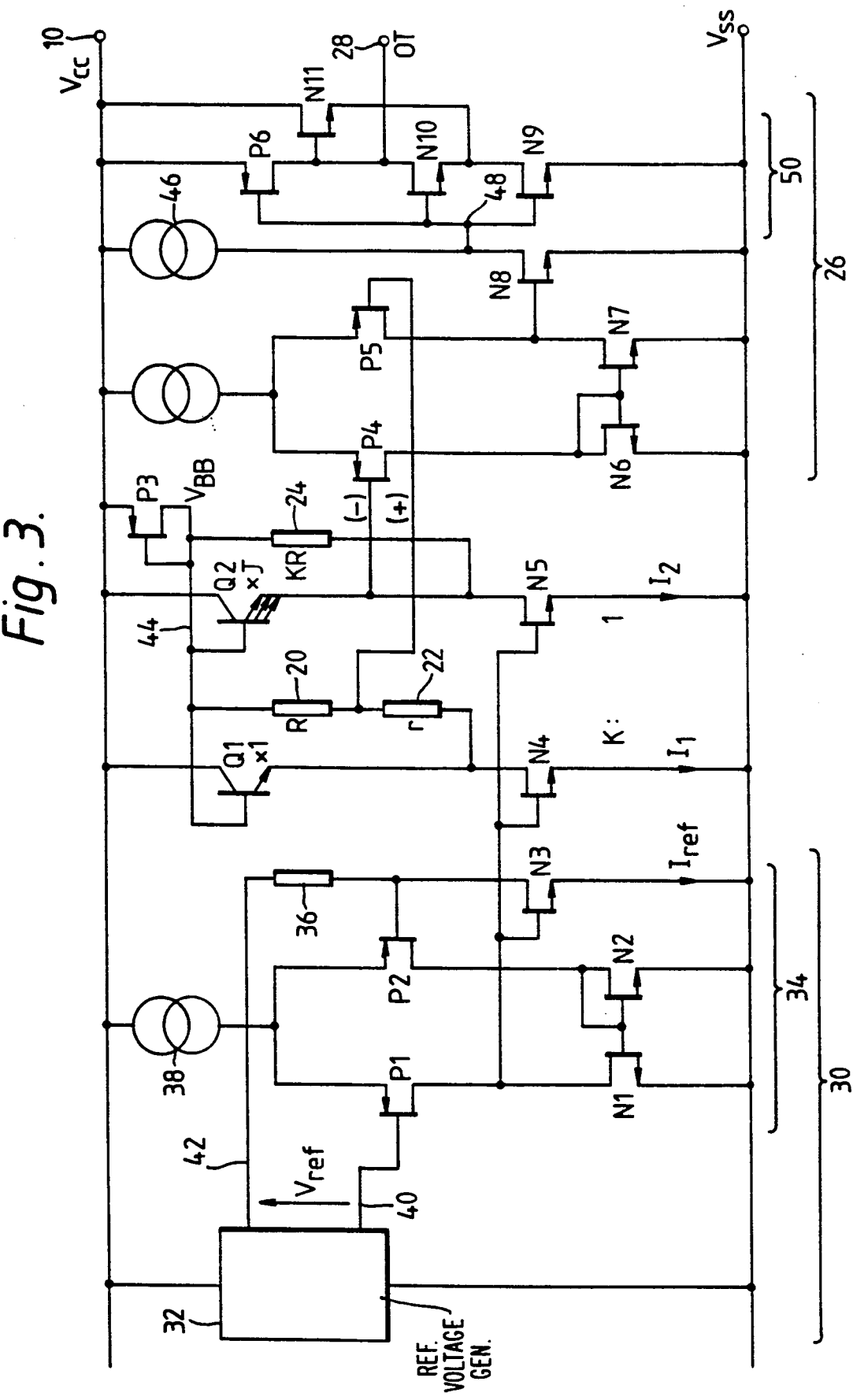
FIG. 3 is a more detailed circuit diagram of a circuit similar to that shown in FIG. 2.

FIG. 3 is a detailed circuit diagram of a circuit embodying the present invention. The reference signs used correspond as far as possible to those used in FIG. 2, so the part of the circuit constructed around the semiconductor junction devices Q1 and Q2 can be recognised at the centre of the Figure. To the left of the central part there is a reference current generator 30 and to the right of the central part there is the voltage comparator 26. Those skilled in the art will appreciate that although particular embodiments of these circuit functions are shown and will be described, the functions are well-known per se and the detailed construction is a matter of choice for the designer. For example, CMOS technology is used in the embodiments since it offers a compact construction with low power consumption and is suitable for integration alongside a power MOSFET, for example. In other applications, the circumstances might favour a different circuit technology.

Similarly, the conductivity types of the components may be chosen to suit the application. In the present embodiment, for example, n-p-n transistors are used for the junction devices Q1 and Q2 since these can be integrated immediately alongside or even in the middle of a vertical n-channel power MOSFET without isolation, if the drain of the power MOSFET is connected to the voltage supply 10 ($V_{CC}$). In other configurations, p-n-p transistors might be preferred.

The reference current generator 30 comprises a voltage reference generator 32, a simple CMOS operational amplifier circuit 34 and a resistor 36. The detailed construction of the voltage reference generator 32 is not shown for reasons of space, and any convenient construction can be adopted. A simple but accurate bandgap voltage reference circuit, for example, is disclosed in copending United Kingdom Patent Application No. 8820836.8, which corresponds to U.S. Pat. No. 4,987,379 (1/22/91). Alternative constructions might use the forward voltage drop across one or more p-n junctions, or might use zener diodes.

The operational amplifier 34 comprises two p-channel transistors P1 and P2 in long-tailed pair configuration with an n-channel current mirror N1, N2 as an active load and a current source 38 to supply the bias current. The voltage reference generator 32 has a first output terminal 40 connected to the gate of transistor P1 which forms the non-inverting input of the operational amplifier 34 and has a second output terminal 42 connected via a resistor 36 to the gate of transistor P2 which forms the inverting input of the operational amplifier 34. The junction of the drains of transistors N1 and P1 is connected to the gates of three n-channel output transistors N3, N4 and N5 of the operational amplifier 34. The drain of the first output transistor N3 is connected to the inverting input of the operational amplifier 34 (gate of transistor P2). The drains of the second and third output transistors N4 and N5 are connected to the emitters of the n-p-n devices Q1 and Q2, respectively, so that those output transistors N4 and N5 form respectively the first and second current sources 12 and 14 shown in FIG. 2.

In operation, the voltage reference generator 32 generates a stable voltage $V_{ref}$ across its output terminals 40, 42 and, by virtue of the negative feedback connection to the gate of transistor P2, the first output transistor N3 of the operational amplifier 34 maintains a reference current $I_{ref}$ in the resistor 36 which is equal to $V_{ref}/R_{36}$ where $R_{36}$ is the value of the resistance 36.

The reference current $I_{ref}$ is mirrored in the second and third output transistors N4, N5 to define the currents $I_1$ and $I_2$ supplied by the current sources 12 and 14, respectively (compare FIG. 2). The ratio $I_{ref}:I_1:I_2$ can be defined according to the well-known current mirror principle by scaling the aspect ratios W/L (channel width W divided by channel length L) of the transistors N3, N4, N5 in the same ratio. The ratio $I_1:I_2$ is of course the factor K defined hereinbefore and which is included in the Equations (6) and (7).

While the collectors of the n-p-n devices Q1 and Q2 are connected to supply 10 ($V_{CC}$) as in FIG. 2, their bases are connected to a separate bias supply 44 at a voltage $V_{BB}$ which is held a few volts below $V_{CC}$ by the action of a diode-connected p-channel transistor P3. This is merely to translate the levels of the signals applied to the inputs of the comparator 26 to values sufficiently far below $V_{CC}$ that the transistors of the comparator can be biased correctly. This level shift does not alter the theory of operation of the circuit from that described earlier, provided that all voltage drops are referenced to $V_{BB}$ instead of $V_{CC}$, since it is the base-emitter voltage characteristics of the n-p-n devices Q1 and Q2 on which the theory depends. Therefore, the potential divider 20, 22 and the resistor 24 are connected to the supply 44 ($V_{BB}$) rather than to the supply 10 ($V_{CC}$).

The comparator 26 is of conventional CMOS construction and comprises a differential input stage formed by four transistors P4, P5, N6 and N7, similar to that formed by the transistors P1, P2, N1 and N2 of the operational amplifier 34, and an output stage comprising an n-channel transistor N8 and a constant current source 46. This output stage drives the input 48 of a threshold detecting circuit 50 formed by four transistors P6, N9, N10 and N11 in a conventional CMOS inverting Schmitt trigger configuration.

In operation, the voltage difference between the inputs of the comparator 26 (gates of transistors P4 and P5) passes through zero as the temperature T of the devices Q1 and Q2 passes through the threshold temperature $T_c$. Below temperature $T_c$, the gate of transistor P4 is held at a lower voltage than that of transistor P5 and the transistor N8 is turned off, holding the input 48 of the threshold detecting circuit 50 high. The output of the threshold detecting circuit 50, which forms the output 28 of the comparator, is thus low and the output signal OT is a logic '0'.

Above $T_c$, the gate of transistor P5 falls below that of transistor P4 and the output 28 of the temperature sensing circuit goes high, i.e. OT='1'. The threshold detecting circuit 50 provides a hysteresis effect which ensures a positive and noise-free switching action as is well known in the art.

In a first example of a circuit such as that shown in FIG. 3, the transistors N3, N4 and N5 are all matched so that $I_2=I_1=I_{ref}=V_{ref}/R_{36}$ and the factor K=1. The factor J in the said first example has the value 10, which is to say that the effective emitter area of the first n-p-n junction device Q1 is ten times smaller than that of the second device Q2. Therefore, the natural logarithm ln(JK) has the value ln(10) or approximately 2.3 in the present example.

By way of providing an application example, the circuit of FIG. 3 may be integrated with a power semiconductor device in order to give an indication in the form of the signal OT='1' when the power device is overheating. Such an application is described in more detail for example, in the above-mentioned EP-A2-0 294 882, incorporated herein by reference. It may be noted that in such an application, stable reference currents may be available already, so that the reference current generator 30 may not need to be provided solely for the temperature sensing circuit. If the nominal desired threshold temperature is 150 degrees Celsius, then we require $T_c=150+273=423$ kelvin, in absolute temperature. If, for example, $V_{BEc}=0.35$ volt, then Equation (6) gives $$\frac{r}{R} = \frac{1.38 \times 10^{-23} \times 423}{1.6 \times 10^{-19} \times 0.35} \times 2.3 \qquad (6)$$
$$= 0.24$$

Therefore, the desired $T_c$ is obtained simply by scaling the resistors 20, 22, 24 so that r=0.24R.

The sensitivity dV/dT of the voltage difference at the inputs of the comparator 26 to changes in the temperature T for the example given can be found from Equation (7):

$$\frac{dV}{dT} = 0.806 \times \frac{1.38 \times 10^{-23}}{1.6 \times 10^{-19}} \times 2.3 + 0.002 \times 0.194$$
$$= 1.60 \times 10^{-4} + 3.88 \times 10^{-4}$$
$$= 0.55 \text{ millivolts per degree Celsius}$$

Sensitivity can be increased if necessary, by increasing the factor J or K or both. Accordingly, in a second example of a circuit such as that shown in FIG. 3, the size of transistor N4 (first current source 12) is increased so that it is ten times larger than transistor N5 (second current source 14). The resistance $R_{24}$ must then be made ten times larger than the resistance $R_{20}+R_{22}$ of the potential divider 20, 22, since the factor K becomes ten and JK becomes one hundred. For $T_c=423$ kelvin with JK=100 and $V_{BEc}=0.35$ volt, Equation (6) gives r=0.48R. The sensitivity dV/dT then becomes $(2.68+6.49)\times 10^{-4}=0.93$ millivolts per degree Celsius, which is almost twice that of the first example.

A temperature threshold sensing circuit such as that described has advantages over a circuit based on a bandgap reference circuit. One such advantage is that in the present invention the voltage drops across the two junction devices can be left to find their own level while the currents are merely held in the appropriate relation to one another. In bandgap temperature threshold sensing circuits an operational amplifier is used to generate a threshold reference level and a temperature-varying signal, while a comparator detects the passing of the threshold value. In constrast, the invention requires only a comparator so that a potential source of offset error is eliminated. In the embodiment shown, the operational amplifier 34 of course will introduce some offset error so that $I_{ref}$ is not exactly $V_{ref}/R_{36}$. This error however is common to both $I_1$ and $I_2$, and since the threshold temperature $T_c$ is dependent primarily on the relative values of $I_1$ and $I_2$, no significant error is caused in the temperature measurement.

Since the resistor 36 may not present a particularly high impedance to the first output transistor N3 of the operational amplifier 34, there may be some systematic offset error in the circuit. While it is clear from the preceding paragraph that this is not a major problem, this error can be compensated if desired, by use of the invention disclosed in copending United Kingdom Patent Application No. 8820836.8, which corresponds to U.S. Pat. No. 4,987,379 (1/22/91). That application describes a particular construction for the bias current source 38 which has not been shown in FIG. 3 for reasons of space. The comparator 26 does not require the use of the special current source described since the input 48 of the threshold detecting circuit 50 presents a very high impedance.

It will be apparent to those skilled in the art that a circuit of the type described could also be modified so that the resistor 24 across the second junction device Q2 is replaced by a potential divider similar to the potential divider 20, 22 across the first junction device Q1. This would mean that a fraction less than unity of the voltage drop $V_2$ would be compared at the input of the comparator 26 with the fraction $V_3$ of the voltage drop $V_1$. It will be appreciated however that such a modification will generally reduce the sensitivity of the temperature sensing circuit.

In an alternative embodiment the resistor 24 is omitted. In this alternative embodiment the current $I_1$ supplied by the first current source 12 may be increased if necessary to compensate for the current flowing through the potential divider 20, 22. Such compensation will not generally be so accurate as that provided by the resistor 24, which would track in value with the potential divider 20, 22. For this reason, the threshold temperature $T_c$ may not be so well defined. However, removing the resistor 24 results in an increase in sensitivity. It has been found that in some manufacturing processes an absolute value for the resistors 20 and 22 (at temperature $T_c$) can be predicted with sufficient accuracy that the increase in sensitivity more than compensates for the loss in accuracy of $T_c$, so that the performance of the circuit as a whole is improved. Furthermore, in the circuit of FIG. 3, for example, the currents $I_1$ and $I_2$ vary in proportion to $R_{36}$. Therefore, the effect of variations in the resistance of the potential divider 20, 22 will be mitigated to some degree, even in the absence of the resistor 24.

Those skilled in the art will recognise that the resistors used in the temperature sensing circuit can be of any convenient integrated construction. For example, they could be regions of doped semiconductor, polycrystalline semiconductor, thin films or even active devices.

From reading the present disclosure, other modifications will be apparent to persons skilled in the art. Such modifications may involve other features which are already known in the design, manufacture and use of temperature sensing circuits and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

We claim:

1. A temperature threshold sensing circuit comprising, first and second bipolar transistors formed together as part of an integrated circuit and biased so that the current density in the first transistor is larger than that in the second transistor by a first known factor, wherein said first and second transistors have their collectors connected to a first bias voltage source, their bases connected to a second bias voltage source and their emitters connected respectively to first and second current sources for passing first and second bias currents of known relative proportions through the first and second transistors, respectively and a voltage comparator connected to compare a first predetermined fraction of the base-emitter voltage of the first transistor with a second, larger predetermined fraction of the base-emitter voltage of the second transistor so that an output of the comparator adopts a first state when the temperature of the two transistors is above a known threshold temperature and adopts a second state when the temperature of the two transistors is below the known threshold temperature.

2. A temperature threshold sensing circuit as claimed in claim 1 wherein the second transistor has an effective emitter area larger than that of the first transistor by a second known factor.

3. A temperature threshold sensing circuit as claimed in claim 2 wherein the first bias current is larger than the second bias current by a third known factor.

4. A temperature threshold sensing circuit as claimed in claim 1 wherein the first bias voltage source also forms a voltage supply for the comparator and the second bias voltage source comprises means for maintaining the bases of the transistors at a voltage offset from that of the first bias voltage source.

5. A temperature threshold sensing circuit as claimed in claim 4 wherein the second bias voltage source comprises a diode-connected MOS transistor connected between the first bias voltage source and the bases of the first and second transistors.

6. A temperature threshold sensing circuit as claimed in claim 1 comprising a potential divider connected between the base and emitter of the first transistor, to provide said first predetermined fraction of the base-emitter voltage of the first transistor.

7. A temperature threshold sensing circuit as claimed in claim 6 further comprising a resistor connected between the base and emitter of the second transistor, the ratio of the total resistance of the potential divider to that of the resistor being equal to the ratio of the base-emitter voltages of the first and second, transistors respectively, at the threshold temperature divided by the ratio of the first and second bias currents respectively.

8. A temperature threshold sensing circuit as claimed in claim 6 wherein the first and second bias currents are generated by first and second current sources dimensioned in accordance with the said known relative proportions but modified to allow for current flowing through the potential divider.

9. A temperature threshold sensing circuit as claimed in claim 1 wherein the second predetermined fraction is unity.

10. A temperature threshold sensing circuit as claimed in claim 1 wherein the first bias current is larger than the second bias current by a further known factor.

11. A temperature threshold sensing circuit as claimed in claim 10, wherein the first bias voltage source also forms a voltage supply for the comparator and the second bias voltage source comprises means for maintaining the bases of the transistors at a voltage offset from that of the first bias voltage source.

12. A temperature threshold sensing circuit as claimed in claim 11, wherein the second bias voltage source comprises a diode-connected MOS transistor connected between the first bias voltage source and the bases of the first and second transistors.

13. A temperature threshold sensing circuit as claimed in claim 6, wherein the second predetermined fraction is unity.

14. A temperature threshold sensing circuit as claimed in claim 1, wherein said first and second bias voltage sources comprise a single bias voltage source.

15. An integrated circuit comprising:
a power semiconductor device whose operating temperature is to be sensed, and
a temperature threshold sensing circuit including first and second bipolar transistors integrated in close proximity to the power semiconductor device, and wherein
the temperature threshold sensing circuit further comprises;
means for biasing the first and second transistors so that the current density in the first transistor is larger than that in the second transistor by a first known factor, wherein said first and second transistors have their collectors connected to a first bias voltage source, their bases connected to a second bias voltage source and their emitters connected respectively to first and second current sources for passing first and second bias currents of known relative proportions through the first and second transistors, respectively and
a voltage comparator connected in circuit so as to compare a first predetermined fraction of the base-emitter voltage of the first transistor with a second, larger predetermined fraction of the base-emitter voltage of the second transistor so that an output of the comparator adopts a first state when the temperature of the two transistors is above a known threshold temperature and adopts a second state when the temperature of the two transistors is below the known threshold temperature.

16. An integrated circuit as claimed in claim 15 wherein the power device comprises an n-channel vertical power MOSFET and the first and second bipolar transistors comprise vertical npn transistors having collector regions continuous with a drain region of the power MOSFET.

17. An integrated circuit for sensing a temperature threshold comprising:
first and second bipolar transistors each having a base, emitter and collector and biased so that the current density in the first transistor is larger than that in the second transistor by a first given factor,
first means connecting the collectors of the first and second transistors in common to a first source of bias voltage,
second means connecting the bases of the first and second transistors to a second source of bias voltage,
third means connecting the emitters of the first and second transistors to first and second current sources, respectively, for passing first and second bias currents in a given ratio through said first and second transistors,
first means coupled between the base and emitter of the first transistor for deriving a first voltage that is a predetermined fraction of the base-emitter voltage of the first transistor,
second means coupled between the base and emitter of the second transistor for deriving a second voltage that is a larger predetermined fraction of the base-emitter voltage of the second transistor,
said first and second voltages being equal at said threshold temperature but different above and below the threshold temperature,
means for applying said first and second voltages to inputs of a voltage comparator which switches between first and second logic states and vice versa at said threshold temperature.

18. An integrated circuit as claimed in claim 17 wherein the second bias voltage source comprises a diode-connected field effect transistor connected between the first bias voltage source and the bases of the first and second bipolar transistors.

19. An integrated circuit as claimed in claim 17 wherein said first voltage deriving means comprises a voltage divider having a tap point at which said first voltage is developed.

20. An integrated circuit as claimed in claim 19 wherein said second voltage deriving means comprises a resistor whose resistance has a predetermined relationship to the resistance of said voltage divider.

* * * * *

Certificate of Correction

Patent No. 2,063,342.    December 8, 1936.

ARTHUR L. SAMUEL

It is hereby certified that errors appear in the printed specification of the above numbered patent requiring correction as follows: Page 2, first column, lines 30 to 32, inclusive, for the last factor of the denominator "$1^2$" read $l^2$; same page, second column, line 14, for "cavity 36" read *cavity 35*, and line 15, for "surfaces 35" read *surfaces 36*; and that the said Letters Patent should be read with these corrections therein that the same may conform to the record of the case in the Patent Office.

Signed and sealed this 24th day of August, A. D. 1937.

[SEAL]

LESLIE FRAZER,
*Acting Commissioner of Patents.*